May 18, 1965           A. JURAS           3,184,368

METAL FIBER CONTAINING STRUCTURES AND METHOD THEREFOR

Filed Dec. 29, 1959           2 Sheets—Sheet 1

(a) COAT METAL FIBERS WITH A UNIFORMLY ADHERENT COATING OF FUSIBLE (HEAT-HARDENABLE OR PARTIALLY CURED) THERMOSETTING SYNTHETIC RESIN

(b) FREE-FALL (FOR EXAMPLE "RAIN") THE SO-COATED METAL FIBERS INTO A FORM OR MOLD OF DESIRED CONFIGURATION THEREBY RANDOMLY ORIENTING AND UNIFORMLY DISTRIBUTING THE COATED FIBERS IN THE FORM OR MOLD

(c) SINTER THE FUSIBLE COATING OF SYNTHETIC RESIN BETWEEN CONTIGUOUS COATED FIBERS AND SIMULTANEOUSLY CURE THE COATING IN THE ABSENCE OF PRESSURE GREATER THAN 20 PSIG TO FORM A HIGHLY POROUS PREFORM COMPRISED OF METAL FIBERS COATED WITH INFUSIBLE SYNTHETIC RESIN

(d) IMPREGNATE THE SINTERED FIBER PREFORM WITH SYNTHETIC THERMOSETTING RESIN BY CONTACT WITH FLUID RESIN USING NO MORE THAN 20 PSIG

(e) CURE THE IMPREGNATING RESIN IN THE ABSENCE OF PRESSURE GREATER THAN 20 PSIG TO FORM A SEMI- OR NON-POROUS SOLID METAL FIBER FILLED SYNTHETIC RESIN STRUCTURE

*Fig. 1.*

INVENTOR.
APPY JURAS
BY *Walter C. Kehm*
ATTORNEY

United States Patent Office 3,184,368
Patented May 18, 1965

3,184,368
METAL FIBER CONTAINING STRUCTURES AND
METHOD THEREFOR
Appy Juras, Detroit, Mich., assignor to Union Carbide
Corporation, a corporation of New York
Filed Dec. 29, 1959, Ser. No. 862,476
9 Claims. (Cl. 161—157)

This invention relates to metal fiber containing structures and method of producing such structures. More particularly, it relates to metal fiber containing structures of widely variable porosity and improved method of fabricating such structures.

Metal fiber filled synthetic thermosetting resins, shaped into castings and similar structures, have found widespread use in industry as stamping dies, vacuum forming tools, filters, jigs, fixtures and the like. Generally, these metal fiber filled structures have been tightly compressed mats of metal fiber embedded in a thermoset resin matrix.

Methods presently used to produce metal fiber filled structures all require the use of pressures of above about one atmosphere, i.e., about 20 lbs./sq.in. and higher up to 300 lbs./sq.in. In a method typical of those presently employed pressure is applied to a loosely packed mass of metal fibers to press the mass down into a mixture comprising liquid heat-hardenable resin and a small quantity of metal fibers. In this manner, the large mass of fibers is immersed in resin and forced to intertwine and intermix with the resin covered metal fibers. When the fibers are inundated and sufficiently well compacted, the thermosetting resin is cured by the application of heat. The product obtained comprises closely knit metal fibers embedded in an infusible matrix of heat-hardened synthetic resin.

The use of pressures in excess of one atmosphere, however, is not desirable from a number of standpoints. It has been found that the compacting of metal fibers tends to stratify them in horizontal layers. Pressure orients the metal fibers, altering considerably the random distribution which ordinarily results from piling the metal fibers loosely. It is the random orientation of the metal fibers which gives strength to the final product uniform in all directions. Thus, the application of pressures in excess of about one atmosphere detracts directly from the strength of the final product.

Of equal importance with random metal fiber orientation in achieving stress resistance in the final product is the uniform distribution of metal fibers throughout the thermoset resin matrix. Uniform density of metal fibers in the product is not readily achieved with "pressure methods" particularly where there is a relatively great disparity between the shallowest and deepest depths of the mold. For example, in fabricating a casting in a mold box containing the model, metal fibers placed directly on top of the highest point of the model are subjected to greater pressures and, hence, packed more densely than metal fibers surrounding the base of the model, with the result that a gradient of metal fiber density from the shallowest portion of the mold to the deepest portion thereof exists. Obviously, the strength of such a casting will vary in proportion to the metal fiber density.

The equipment required for the pressure method of fabrication is expensive and, for large structures especially, extremely bulky.

Furthermore, known fabricating methods lack versatility with regard to the end products. Recently, there has been a demand for porous and semi-porous as well as solid structures. Methods heretofore known have been not readily adaptable to the production of any but solid metal fiber filled articles.

It is an object of my invention, therefore, to provide a method for fabricating metal fiber containing structures which obviates the use of pressure in excess of a few pounds per square inch.

It is another object to provide a method for fabricating metal fiber containing structures having randomly oriented metal fibers and a highly uniform density.

It is a further object to provide metal fiber structures suitable for impregnation with synthetic thermosetting resin.

It is a still further object to provide metal fiber containing structures of controlled porosity.

It is a highly specific object of my invention to provide metal fiber filled synthetic resin castings and similar articles of uniform strength, density and controlled porosity.

In the drawings:

FIGURE 1 is a flow diagram of the procedural steps embodied by the method of the present invention;

Figure 2:
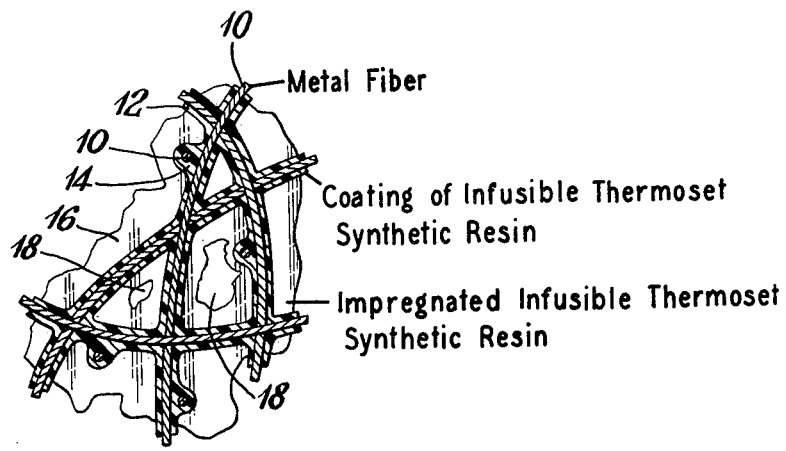
FIGURE 2 is a greatly enlarged view in cross-section of a portion of a structure of the present invention.

I have now discovered that these and other objects are accomplished by coating suitable metal fibers with a thermosetting synthetic resin, randomly and uniformly distributing the so-coated metal fibers in the desired configuration, sintering the synthetic resin between contiguous coated fibers and curing the synthetic resin coating with no more than 20 pounds per square inch guage pressure to form a highly porous semi-rigid to rigid structure of metal fibers coated with infusible synthetic resin.

To form a semi-porous or completely non-porous, solid metal fiber filled synthetic resin structure also with the use of no more than 20 pounds per square inch guage pressure in accordance with my invention, I remove the sintered, completely cured porous coated metal fiber structure from the mold or similar configuring means, fill the mold with fluid or solid, powdery thermosetting synthetic resin of the same or different chemical nature as the metal fiber coating, reinsert the completely porous metal fiber structure in the resin using no greater pressure than is needed to immerse the structure in the resin and in no event more than about 20 pounds per square inch guage. I can vary the degree of porosity in the final product by varying the time during which the coated metal fiber structure is immersed in the resin. For example, to produce a highly porous final product, I dip the coated metal fiber structure briefly in the liquid resin one or two times and cure the structure after excess resin has been drained off or otherwise removed. For a slightly less porous article, additional and longer inundations or dips in the resin are used. To form a completely resin filled coated metal fiber structure, the structure is completely immersed in the fluid resin and the resin is cured without application of pressure beyond that needed to keep the coated metal fiber structure immersed in the resin and always less than about 20 pounds per square inch guage.

The length and number of the immersion periods are not the sole determining factors in the degree of porosity obtained in the final product. Other factors include: (1) viscosity of the liquid resin used as an impregnant; (2) relative denseness of the coated metal fiber structure used as a preform, which in turn is affected by the length and size of the metal fibers used; and (3) the time allowed for draining or removal of excess resin prior to curing.

Materials useful in the method of my invention for making metal fiber filled structures are numerous as regards both the metal fibers and the thermosetting resins.

My preference for lengths and cross sections of fibers used depends upon the end use of the article being made and the degree of density or porosity desired. I have found that metal fibers in the cross section range from 0.0001" to 0.040" and length ranges from .010" to 3" are most practical. By selecting both cross sections and lengths from this range, variable degrees of porosity and density are readily obtained without the use of pressure. As an example, a copper fiber which has a cross section of 0.0035" x 0.002" and is 1/8" long will "air felt" or "rain" into a mold without pressure at 60 pounds per cubic foot. Another copper fiber with exactly the same cross section but a length of 3/16" will "air felt" or "rain" into the mold at 40 pounds per cubic foot.

Only slight changes in either or both cross section and length will give a different density. In other words, I can obtain an infinite range of densities by pre-selection of fiber dimension rather than by pressure. I prefer metal fibers having a length of from 1/8" to 1/2" to achieve the optimum fiber density and resin impregnability in the preform structure. Fibers useful in this invention can be drawn, extruded, cut, broached, turned or otherwise formed into elongated shapes.

Basically, the metal fiber containing structures of my invention comprise a myriad of relatively short metal fibers which are fairly uniform in their general geometrical configuration but possess a number of irregularly occurring non-uniform features such as twists along their longitudinal axis, sharp protuberances and small barbs extending from their generally planar surfaces, said metal fibers, by reason of these irregularities, hook and intertwine one with another to form orderly geometrically patterned arrangements. The use of pressure to compact these fibers destroys this orderly arrangement and prevents exploitation of the benefits, particularly strength, inherent in a geometrical arrangemnt.

Other metal pieces than resin coated fibers can be included in the structures of my invention. For example, metal flakes and/or uncoated steel wool and similar materials can be added to the structures at any time prior to final curing in order to increase strength, impart additional resistance, or give a highly specific property advantage to certain areas such as, providing extremely close matting near the surface of the structure and like purposes.

Useful resins for the metal fiber coating and metal fiber filled structure matrix in my invention are of the thermosetting type. In general, I can use the phenolic resins, polyester resins, epoxy resins of the glycidyl ether type and epoxy resins of the peracetic acid derivative type. I have found that the above broad classes of thermosetting resins provide the excellent adhesiveness and bond strength required in the structure of my invention.

More particularly, among the phenolic resins, I prefer condensation products of 2,4,6 - tris(hydroxymethyl) phenol; phenol-formaldehyde resoles and novalacs; dimethylol ureas; dimethylolmelamine; trimethylolmelamine and other melamines; acetone-formaldehyde resin; and dimethyl hydantoinformaldehyde resin. I particularly prefer phenol formaldehyde resins containing less than one mole of formaldehyde per mole of phenol, i.e., the novalacs.

The unsaturated polyester compositions suitable for our purpose are the esterification products of ethylenically unsaturated dibasic acids or their anhydrides, such as fumaric acid and maleic anhydride, or mixtures of such acids or anhydrides with saturated acids or anhydrides, such as adipic acid and phthalic anhydride with polyvalent alcohols, usually glycols such as ethylene and diethylene glycol. These polyesters are quite readily soluble in styrene and other vinyl monomers to form resin syrups which in the presence of catalysts and activating agents will polymerize either at room temperature or by the application of heat and slight pressure to solid infusible plastic. The polymerization is exothermic and no volatile by-products are formed. Pure glycol maleate-styrene copolymer is rather brittle, but using longer glycols or by replacing part of the maleic acid with long chain aliphatic acids, such as adipic acid, a tougher and more flexible resin is obtained.

Suitable catalysts for unsaturated polyester compositios as above described are free radical initiators such as peroxides and azo compounds, such as benzoyl peroxide, tertiary butyl perbenzoate, methyl ethyl ketone, peroxide and the like. Since most unsaturated polyester compositions are unstable on storage, they usually are marketed in the liquid form and contain a stabilizing inhibitor such as tertiary butyl catechol, hydroquinone and the like. The curing catalyst is then added just prior to the intended time of using the polyester compositions.

Among the epoxy resins of the glycidyl ether type, I prefer the polyglycidyl ethers of polyhydric phenols. Suitable di- and polynuclear phenols useful for the preparation of the polyglycidyl ethers are the bisphenols described by Bender et al. in U.S. Patent No. 2,506,486 and polyphenols such as the novalak condensation product of a phenol and a saturated or unsaturated aldehyde containing an average of from 3 to 20 or more phenylol groups per molecule (cf. book by T. S. Carswell entitled "Phenoplasts," published in 1947 by Interscience Publishers of New York). Examples of suitable polyphenols derived from phenol and an unsaturated aldehyde, such as acrolein, are the triphenylols, pentaphenylols and heptaphenylols described in U.S. Patent 2,801,989 and application Serial No. 368,514, filed July 16, 1953, now U.S. Patent No. 2,885,385, both by A. G. Farnham.

The polyhydric polynuclear phenols can consist of 2 or more phenols connected by such groups as methylene, alkylene, ether, ketone or sulfone, exemplified by the following compounds: bis(p-hydroxyphenyl) ether, bis-(p-hydroxyphenyl) ketone, bis(p-hydroxyphenyl)methane, bis(p-hydroxyphenyl)dimethyl methane, bis(p-hydroxyphenyl) sulfone, or trisphenol having the formula:

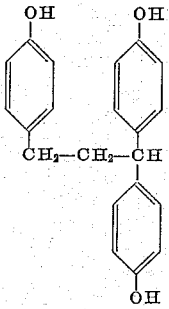

a tetraphenol having the formula:

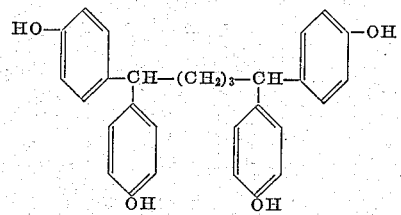

The useful epihalohydrins for reaction with the above di- and polyhydric phenols include epichlorohydrin.

I particularly prefer as an epoxy resin of the glycidyl ether type the polyglycidyl ether of 2,2-bis(4-hydroxyphenyl) propane; the triglycidyl ether of tris 1,1,3-(hydroxyphenyl) propane; mixtures of the above with minor proportions of bis (2,3-epoxy-cyclopentyl) ether and/or butyl glycidyl ether; the diglycidyl ether of dihydroxy diphenyl methane; and the polyglycidyl ether of a 6–7 ring phenol formaldehyde novalak.

Among the peracetic acid derived di- and polyepoxides, I prefer alkyl 9,10-epoxystearate; butadiene dioxide; 1,2-diisobutylene dioxide; 3,4 - epoxy-6 - methylcyclohexylmethyl; 3,4-epoxy-6-methylcyclohexanecarboxylate; 3,4-epoxycyclohexane carbonitrile; 2,3-epoxy-2-ethylhexanol; 3,4-epoxy-6-methylcyclohexylmethyl acetate; ethyl 3-oxatricyclo-(3.2.1.0$^{2,4}$)-octane-6-carboxylate; styrene oxide, triisobutylene oxide; vinylcyclohexene dioxide; and vinyl. cyclohexene monoxide.

I employ conventional hardeners with the above-described resins of the types and in amounts well known to those in the art. I particularly prefer to employ hexamethylene tetramine as a hardener in the phenolic type resins. With the epoxy resins, I prefer as hardeners acid anhydrides, amines and mixtures of amines because of their low cost and good reactivity rates. Among the suitable amines, aromatic amines have been found most desirable. Typical of these compounds are: α-methylbenzyldimethylamine; 4,4'-methylene dianiline and phenylene diamine.

As with any metal fiber containing thermoset resin structures, the structures of my invention can include fillers, colorants, pigments and similar additives conventionally used in conjunction with thermosetting resins. In incorporating additives into the thermosetting resin, it is essential to avoid decreasing the mobility of the resin to the point where impregnation of the porous preform is deleteriously affected. Except for this limitation, any conventional additives can be added and in any amounts.

I have found it possible to achieve metal fiber containing structures of even greater density where this is desired by the use of metal flakes and the like as hereinbefore described, and other inorganic fillers coated with resin if desired, in conjunction with the coated metal fibers used in accordance with my invention.

As is illustrated by the flow diagram of FIGURE 1, the method of my invention for forming impregnated porous articles basically comprises the following steps: (a) coating the metal fibers with fusible synthetic thermosetting resin, (b) randomly distributing the coated fibers in the desired configuration, (c) sintering the fiber coatings together and simultaneously curing the resin coatings, (d) impregnating the sintered fiber structure with synthetic thermosetting resin by contact with fluid resin, and (e) curing the impregnated resin.

For purposes of illustration, a portion of a semi-porous structure of the present invention produced by the method outlined in FIGURE 1 is shown in FIGURE 2. The structure is shown to include randomly oriented and uniformly distributed metal fibers 10 provided with cured infusible synthetic resin coating 12. Coatings 12 of contiguous, contacting coated metal fibers 10 are sintered, i.e., flowed together to form homogeneous bond 14 between metal fibers 10 at each point of contact. Cured impregnated synthetic resin 16 is shown to partially fill the voids between coated metal fibers 10 leaving pores 18. As disclosed herein, the voids between coated metal fibers 10 can be completely filled by cured impregnated synthetic resin 16 leaving no pores.

By the term "fluid" resin I mean liquid resins i.e. natural liquid resins, melted solid resins, solvent solutions of solid or liquid resins and dispersions of resins and the like as well as powdered solid resins which can be coated onto fibers i.e. made to uniformly adhere thereto or impregnated into a porous preform by fluid bed techniques, dusting and the like.

In particular, I carry out the method of my invention by preparing a fluid resin with which to coat the metal fibers. The coating is conveniently applied by dispersing the fibers in a dilute solution of resin such as a 50% by weight solution of resin in a solvent such as acetone. Undiluted resins are also suitable providing the viscosity thereof permits coating action. The solvent used, if any, is not critical; the ability to dissolve the resin, but not the metal, being the sole criterion. Suitable solvents include ketones, toluene, and alcohols. Lower boiling solvents such as acetone and methyl isobutyl ketone are preferred since they are rapidly removable by air or oven drying and are less likely to cause premature setting or curing of the resin in being removed.

Once the metal fibers have been covered by resin to the desired thickness, they are removed from the fluid resin. Where solvent containing resin solutions are employed in coating, the so-coated fibers are spread out in thin layers in pans or other suitable flat surface and air or oven dried. Oven-dried coatings are partially cured during drying. Air-dried coatings are subsequently subjected to heat for a time sufficient to cause only partial curing of the resin. The amount of cure imparted to the resin coating is critical in the present invention. The resin must be advanced beyond the liquid stage but must not reach the infusible or heat-hardened stage. This "in-between" state of cure is generally termed the "B-stage" in the art. The state of cure before "B-stage" is known as "A-stage" and the stage of cure after "B-stage" i.e. the thermoset resin is known as "C-stage." In my invention, the resin during the coating operation is "A-stage," after air-drying and partial curing it is "B-stage" and after further and complete cure, later imparted in accordance with this invention, "C-stage." The "A-stage" resin will herein be referred to as fluid resin, the "B-stage" resin as fusible, heat-hardenable or partially cured resin, and the "C-stage" resin as infusible or heat-hardened resin.

Partial cure of the resin coating is conveniently accomplished by exposure of the coating to room temperatures for from 14 to 24 hours. This time can be reduced through the use of oven curing, but curing conditions are delicate and care must be taken to advance the resin to only the "B-stage." Temperatures in excess of 80° C. are to be avoided, as is exposure to temperatures near 80° C. for longer than 8 hours in the use of oven curing for the resin coating.

There is sometimes a tendency on the part of the coated metal fibers to cohere and loosely clump together during partial curing. These clumps are easily broken up by mechanical means, such as tumbling for a brief period or passing the clumped fibers through a flocking machine. Obviously, a bonding together of fibers, which is difficult or impossible to break apart, is to be avoided during the partial curing of the resin coating.

The metal fibers, after being coated, are randomly distributed in the form or mold which provides the desired configuration. Any method of introducing the coated metal fibers into the mold which assures obtaining a coated metal fiber mass, wherein layering, stratification, or a predominant orientation is not apparent, is desirable. The coated metal fibers preferably are disposed throughout the mold or form in every direction. Coated metal fibers within the mass are in abutting contact with many fibers both horizontally and vertically adjacent, so that the resultant mass is a mat-like plexus of interwoven, intertwined, interlaced, closely adjacently disposed coated metal fibers.

Suitable means for so disposing the coated metal fibers include manual and mechanical means. I prefer to fill the mold or form by gravity, i.e., through free fall of the coated metal fibers from a suitable dispersing apparatus. I have found that by this "raining" technique I acheive the maximum randomness of distribution and orientation. Quite conveniently, the free fall filling of the mold can be combined with the flocking or separating of the clumps of coated metal fibers.

A suitable device for randomly distributing the coated metal fibers comprises a hopper having a rotating brush at the bottom thereof in contact with a coarse screen. If desired, the flocking action can be speeded up by the use of a vacuum connection to pull the fibers from the brush. Also suitable, is sifting through coarse screens, e.g., about 10 mesh.

Methods alternative to the above-described methods of coating and distributing the metal fibers are also within the scope of my invention. For example, spray coating of flocked uncoated fibers with resin, or resin and hardener as they fall into the mold is a suitable technique for building a mold filling structure of coated metal fibers which can subsequently or simultaneously be cured to a semi-rigid or rigid structure, impregnable with thermosetting resin. If desired, metal fibers having an adhering coat of powdered thermosetting resin such as are formed in fluid bed coating techniques can be fed by gravity into a mold and the coating fused and cured thereon by application of heat to form a porous structure.

The fibers added to the mold can be heated prior to such addition or after addition. Preheating the fibers and coatings as they fall by means of infra-red lamps or other source of radiant heat is preferred. Then, after the mold is completely filled and the mass of warmed coated metal fibers has configured to the pattern of the mold, the mold is heated to a temperature and for a time sufficient to completely cure, i.e., render infusible and completely harden the coating on the metal fibers. Suitably, the heating is at 300° F. for 2–3 hours in an oven or by radiant means. Before the resin coating becomes infusible i.e. reaches "C-stage" and during the curing process, the coatings of contiguous, contacting coated metal fibers sinter, i.e., flow together to form a homogeneous bond between the metal fibers at each point of contact. The result of complete curing and sintering at all points of contact is a semi-rigid, i.e., not easily deformable, to a rigid, i.e., non-deformable, porous structure. The top and sides of the molded porous structure can be trimmed free of protruding fiber ends and/or coated with a resin to form a smooth, protuberance-free surface which can be porous if desired.

When the resin coatings on the metal fibers have sintered and been cured, the resulting porous structure, herein termed a preform, is removed. While this porous structure has utility in and of itself, e.g., as a filter, an important use is as a preform for the fabrication of semi-porous and solid structures. To achieve these structures, I impregnate the porous preform with thermosetting resin to the extent that a decrease in porosity is desired.

Impregnation can be achieved in a variety of ways. A method which I have found most advantageous utilizes immersion of the porous preform to achieve impregnation. Preferably, immersion is carried out in the same mold as was used to shape the porous preform. The mold is filled or partially filled with resin, and the porous preform is immersed therein for a period sufficient to ensure the desired degree of infiltration into the porous preform. I have found that several dips of shorter duration, separated by a period of draining, is more effective in achieving a uniformly resin-impregnated and, hence, a more uniformly porous structure than a single dip equal in length to the sum of several shorter dips.

For a completely solid metal filled resin structure, I immerse the porous preform and hold it in the resin impregnant until impregnation is complete. Then, heat is applied and the resin impregnant cured with the porous preform clamped therein. Cure of the semi-porous structures is readily accomplished by heating the drained porous preform and curing the resin filled interstices thereof.

The resins suitable for use as impregnants are the same as are suitable for coating the metal fibers. The same or different resins can be used for coating the metal fibers and impregnating the porous preform. Obviously, the viscosity of the impregnant should be such as will facilitate impregnation.

Curing of all the thermosetting resin coating or impregnant in my invention is accomplished without the use of pressure above 20 pounds per square inch guage. Seldom, if ever, is pressure in excess of 5 pounds/sq. in. required. The only step in the method of my invention requiring the use of any pressure is in immersing the porous preform in the impregnant. If desired clamps may be used to keep the porous preform immersed in the impregnant. There is no pressure applied during the various curing steps of my invention. For this reason I term my process a "pressureless method." It is the absence of pressure which eliminates the non-uniformities, uneven strengths and erratic performance sometimes encountered in pieces fabricated by "pressure methods" heretofore known.

My method in a preferred embodiment comprises agitating fusible resin coated metal fibers through a screen, heating the metal fibers indirectly as they fall freely from the screen to the mold in rain-like fashion, heating the thus randomly fallen fibers by radiant, gas, electric or other suitable heating means until the coatings are sintered at points of contact and completely cured, removing the preform from the mold, filling the mold with a resin-hardener mixture, reinserting the preform in the mold whereupon the preform absorbs the resin-hardener mixture in the mold, clamping the preform back in the mold and fully impregnating it and curing the impregnated resin, and removing the resultant metal fiber containing infusible resin structure.

In order to illustrate the practice of my invention, the following examples are provided. All parts and percentages are by weight unless otherwise indicated.

EXAMPLE I

*Preparation of a copper-aluminum fiber filled tool with diglycidyl ether epoxy*

Copper-aluminum alloy fibers 0.25" in length consisting of 3 parts copper and 2 parts aluminum by volume were soaked in a solution consisting of 100 parts epoxy resin [a mixture of 88% diglycidyl ether of 2,2 bis(4-hydroxyphenyl) propane and 12% butyl glycidyl ether]; and 19 parts hardener for the resin comprised of 6 parts 2,2 bis(4-hydroxyphenyl) propane, and 40 parts 4,4'-methylene dianiline, 60 parts phenylene diamine all dissolved in 100 parts acetone. After the fibers were thoroughly soaked, they were spread out over a large area to allow air evaporation of the acetone. The drying at room temperature was continued for 15 hours. Clumps of fibers formed as the resin coating partially set. The clumped fibers were placed in the hopper of a Peco Steel-Flock Unit sold by Progressive Equipment Company and were separated into individual coated fibers by being forced against a coarse screen by a rotating brush operating at the bottom of the hopper.

The separated fibers were "rained" into a steel mold measuring 3" in width, 5.5" in height and 10" in length which had been precoated with two coats of a wax-type silicone based release agent. When the mold was filled with "rained" coated fibers, the mold and contents were heated at 300° F. for one hour. A rigid structure of great porosity was formed. This structure consisting of copper-aluminum alloy fibers held together by their now sintered, and cured resin coatings was removed from the mold and set aside.

Epoxy resin of the same chemical nature as the epoxy resin used for coating the metal fibers was mixed with the same hardener as used with the coating resin in a proportion of 100 parts epoxy resin per 19 parts hardener. It will be noted that the only difference between the resin used to coat the fibers and the resin used to impregnate the preform structure was in the absence of acetone solvent in the latter. The impregnating mixture was poured into the mold.

The preform was then reinserted in the mold. Impregnating resin filtered into the preform from all sides, filling the voids and interstices between interlocking adjacent fibers. The preform was fixed in place with suitable clamps to prevent the preform from rising out of the mold. The mold and clamped preform assembly was placed in an oven at 25° C. The temperature was raised to 160° C. and the epoxy resin was heated for one hour.

The finished tool was removed and found to have a metal fiber content of 34.2% by weight and a resin content of 65.8% by weight. Shrinkage of the part formed was 0.005 in./in. length. The appearance of the tool part was slightly porous. The specific gravity was found to be 1.61.

EXAMPLE II

*Preparation of copper-aluminum fiber filled article with diglycidyl ether epoxy and peracetic acid derived epoxide*

Soaking, fabricating and curing procedures were the same as in Example I. The resin used, however, was different. As the thermosetting resin coating and impregnant 100 parts of a 50% by weight acetone solution comprising a mixture of 62.5% diglycidyl ether of 2,2-bis(4-hydroxyphenyl) propane and 37.5% bis(2,3-epoxycyclopentyl)ether, a peracetic acid derived epoxide; and 27 parts of the hardener used in Example I were employed.

A casting having a length of 6.5", a height of 2" and a width of 1.125" was made in a mold. Shrinkage was 0.005 in./in. length. The resulting slightly porous casting contained 36.7% metal fiber, 63.3% cured epoxy resin and had a specific gravity of 1.68.

EXAMPLE III

*Preparation of copper-aluminum fiber filled article with acid anhydride cured di- and triglycidyl ether epoxy resins*

The procedure of Example I, except for the resin, and the mold of Example II, was used. Employed as the thermosetting resin coating and impregnant was a 50% acetone solution comprising a mixture of 50 parts of a diglycidyl ether epoxy resin [2,2-bis(4-hydroxyphenyl) propane], 50 parts of a triglycidyl ether epoxy resin [triglycidyl ether of tris(1,1,3-hydroxyphenyl) propane] with, as a hardener, a mixture of 97 parts methyl Nadic anhydride and 0.25 part α-methylbenzyldimethylamine. The very slightly porous finished part had a metal fiber content of 39.8%, and a resin content of 60.2%. Again, shrinkage was 0.005 in./in. length. The specific gravity was 1.71.

EXAMPLE IV

*Preparation of porous vacuum mold*

A plaster mold designed to form refrigerator trays was coated with a plaster sealer, two coats of mold release agent, one coat of polyvinyl alcohol, and an additional coat of mold release agent in that order. A face coat was applied which comprised stainless steel flake in a mixture of the epoxy resin and hardener used in Example I and in the same proportions. Immediately thereafter uncoated 0.25" aluminum fibers (medium grade, sold by SOS division of General Foods Corporation) were flocked into the plaster mold in an amount sufficient to cover the face of the mold. The resin was allowed to advance to the "B-stage" at room temperature overnight. The mold with the "B-stage" resin, stainless steel flake, and aluminum fiber facing was placed on a rotating turntable under the screen of a flocking machine. Four infra-red lamps were directed at the space intervening between the mold and the screen. Aluminum fibers coated with the same epoxy resin-hardener system used for the facing were "rained" down from the screen through the infrared beams and into the slowly rotating mold. The four lamps were then directed at the mold until the resin coated on the mass of fibers sintered together at points of contact and cured. Then, the porous structure was removed from the plaster mold.

A mixture in 200 parts acetone of 100 parts 88% diglycidyl ether of 2,2-bis(4-hydroxyphenyl) propane 12% butyl glycidyl ether and 19 parts of the amine hardener used in Example I was poured over and through the porous structure and allowed to drain off. The porous structure, with some impregnant trapped therein, was completely cured in an oven. The treatment with dilute resin described immediately above was repeated and again the structure was cured. A porous vacuum mold was obtained. The mold was set up on a vacuum box and impact grade polystyrene sheet, 0.040" thick was satisfactorily vacuum formed into refrigerator trays thereagainst.

EXAMPLE V

*Preparation of porous part with steel fibers and phenolic powdered resin binder and epoxy resin coating*

A mixture of 100 grams of ⅛"–¼" long steel wool fibers with 25 grams of a powdered novolak 2-step phenolic resin containing 9.6% hexamethylene tetramine hardener was enclosed in a container until all the fibers were completely coated with resin by dusting. The powder coated fibers were sifted into a mold. The mold and contents were heated to 178° C. for five minutes. The fibers amounted in height to 1". The porous resulting structure was removed from the mold and dipped and then cured twice after the manner and in the acetone-resin-hardener system of Example IV. The finished product was a rigid porous structure of steel fibers having a curved novolak resin binder and an epoxy resin coating to reduce porosity. The finished part is useful as a small automobile part where a combination of strength and porosity is desired.

EXAMPLE VI

The procedure of Example V was followed except that the porous structure was not impregnated by dipping in the acetone-epoxy resin hardener system. The mold after removal of the porous structure was coated with a mold release agent and filled with the impregnating resin system of Example 4. The porous structure was lowered slowly into the resin and completely saturated with said resin. A small weight was placed on top to prevent the porous structure from floating in the resin. The assembly was cured at room temperature overnight and then cured in an oven for two hours at 160° C. The finished part was strong, solid and showed no shrinkage.

EXAMPLE VII

*Porous fixture from steel fibers powdered epoxy resin, and liquid epoxy coating*

A powdered solid epoxy resin made from diglycidyl ether of 2,2-bis(4-hydroxyphenyl) propane reacted with 2,2-bis(4-hydroxyphenyl) was used. To 100 parts of this resin were added 30 parts phthalic anhydride as a hardener and sufficient ⅛"–¼" steel wool fibers to provide a final product containing 80% by weight metal fibers. The components of the mixture were blended by tumbling thoroughly.

The powdered resin coated fibers were sifted into a speaker cone mold using a shifting machine. The loaded mold was placed in an oven and cured at 178° C. After cooling, the porous parts was removed from the mold and dipped into a 50% solution in acetone of 100 parts diglycidyl ether of 2,2-bis(4-hydroxyphenyl) propane and 19 parts of a mixture of 6 parts of 2,2-bis(4-hydroxyphenyl) propane, 40 parts 4,4'-methylene dianiline and 60 parts phenylene diamine. The structure was allowed to drain and cure at room temperature. Final cure was at 160° C. for two hours.

The cured porous fixture was trimmed and mounted on a vacuum box for use in drying speaker cones by the drawing of air through the fixture.

EXAMPLE VIII

*Metal stamping die by low pressure process*

Steel wool fibers ⅛"–¼" were coated with the epoxy resin system of Example I by the method of that example. The resulting porous structure was replaced in the mold after filling the mold with epoxy resin-hardener mix and held in place by a 10 lb. weight (3 lb./sq. in.) and allowed to advance to "B-stage" overnight. The mold with the impregnated die therein was cured by gradually raising the temperature to 150° C. over a period of four hours, then curing for an additional two hours at 150° C. The solid stamping die produced contained 74–2% resin and 25.8% metal fiber by weight.

For comparison, a metal stamping die was formed by the high pressure process, heretofore known, as follows: The same resin and fiber were mixed, put into a mold and pressed at 300 lb./sq. in. for four hours at 178° C. The resulting stamping die contained 44–48% resin and 52–56% metal fibers.

The dies made above were tested by forming a 22 gauge cold rolled steel piece against the die and measuring the wear. The figures given below are the amount of increase in mils (1/1000 of an inch) in the corner radius at a particular point in the die. Results are summarized in Table I.

TABLE I

| Number of stampings | High pressure process formed die [1] | Pressureless process formed die [2] |
|---|---|---|
| 500 | 8 | 5 |
| 1,000 | 9 | 7 |
| 2,000 | 12 | 12 |
| 3,000 | 12 | 13 |
| 5,000 | 13 | 15 |

[1] Containing 52–56% metal fibers (increase in corner radius in mils).
[2] Containing 25.8% metal fibers (increase in corner radius in mils).

The results clearly indicate the superiority of the "pressureless" dies over the high pressure formed dies.

A particularly outstanding feature of my invention is the obtaining of metal fiber containing structures, such as metal fiber reinforced castings, of more nearly equal density (specific gravity) and more uniform metal fiber distribution. This aspect of the invention can be clearly pointed up by a comparison of the variations in specific gravities existing in castings made by my novel pressureless process and the heretofore known high pressure process at various points (designated 1–8 in Table II below) throughout the castings. The high pressure castings were made by saturating 20% of the total metal fibers used with resin and placing them in the mold, adding the remainder of the fibers and pressing the subsequently added fibers down into the original fibers under pressures of 300 lb./sq. in. and curing the mass under pressure in a hydraulic press at a platen temperature of 178° C. for four hours. The salient properties of both of the castings and the comparison of the specific gravity variations extant therein are given below in Table II. The pressureless casting was made according to the procedure of Example I. The resin used in the comparison casting was the same as in Example I.

TABLE II

| Property | High pressure process | Pressureless process |
|---|---|---|
| Metal fiber content, percent | 65.8 | 34.2 |
| Resin content, percent | 34.2 | 65.8 |
| Shrinkage | (1) | (2) |
| Appearance | (3) | (4) |
| Specific gravity of entire casting | 2.37 | 1.61 |
| Sampling points: | | |
| 1 | 2.27 | 1.66 |
| 2 | 2.43 | 1.58 |
| 3 | 2.42 | 1.63 |
| 4 | 2.34 | 1.64 |
| 5 [5] | 2.46 | 1.68 |
| 6 [5] | 2.32 | 1.62 |
| 7 [5] | 2.45 | 1.66 |
| 8 [5] | 2.36 | 1.63 |
| Mean sp. gr. $(\overline{m})$ | 2.38 | 1.64 |
| Standard deviation ($\sigma$) | 0.07 | 0.03 |
| Coefficient of variation $\left(=\frac{\sigma}{\overline{m}}\right)$ | 0.029 | 0.019 |

[1] 0.00 in./10.25 in. length.
[2] 0.005 in./in. length.
[3] Very slightly porous.
[4] Slightly porous.
[5] Identical ¼″ thick sections from neighboring strips.

As is evident from the above detailed description of the method and articles of my invention, I have made a discovery useful wherever metal fiber reinforced shaped castings are desired, and particularly where the castings are large when high pressure casting techniques are uneconomical.

The castings made in accordance with my invention are especially useful for dies, tools, checking fixtures, bearings, clutch facings, and brake linings either solid or porous as required.

Sheet materials are produced which are useful as structural panels, for example, as panels used for the back-up structure for models, jigs and fixtures. Also, the panels can serve as laths for plastering applications. Other uses, especially for porous structures, include reinforcing cores for sandwich panel construction, particularly where contours are complicated and heat resistance required, acoustical panels, filtering screens and preform screens.

If desired, any of the parts fabricated by the method of this invention can be surface coated to cover or partially cover protruding portions of fibers. The coating can be either porous, semi-porous or non-porous and either rough or smooth textured.

What is claimed is:

1. A porous metal fiber-containing structure of uniform density comprising a mass of randomly oriented and uniformly distributed metal fibers ranging in length from about 0.010 inch to about 3 inches and in diameter from about 0.0001 inch to about 0.040 inch substantially completely coated with a uniformly adherent coating of an infusible thermoset synthetic resin sintered together at points of contact between adjacent metal fibers.

2. A porous metal fiber-containing structure of uniform density comprising a mass of randomly oriented and uniformly distributed metal fibers ranging in length from about 0.010 inch to about 3 inches and in diameter from about 0.0001 inch to about 0.040 inch substantially completely coated with a uniformly adherent coating of an infusible thermoset synthetic resin sintered together at points of contact between adjacent metal fibers, said structure being at least partially and uniformly filled with an infusible thermoset synthetic resin.

3. A non-porous metal fiber-containing structure of uniform density comprising a mass of randomly oriented and uniformly distributed metal fibers ranging in length from about 0.010 inch to about 3 inches and in diameter from about 0.0001 inch to about 0.040 inch substantially completely coated with a uniformly adherent coating of an infusible thermoset synthetic resin sintered together at points of contact between adjacent metal fibers, said structure being completely filled with a thermosetting synthetic resin.

4. The structure claimed in claim 3 wherein the infusible synthetic resin forming the coating is a phenol-formaldehyde novalac and the synthetic resin completely filling the structure is a polyglycidyl ether of a polyhydric phenol.

5. Method for forming metal fiber-containing structures of uniform density which comprises the steps of free-falling substantially completely coated metal fibers less than about three inches in length into a mold of desired configuration thereby randomly orienting and uniformly distributing said coated metal fibers in said mold, said coating being uniformly adherent and comprising fusible thermosetting synthetic resin, heating said coated metal fibers to a temperature sufficient to sinter said coatings together at points of contact between adjacent metal fibers, and simultaneously curing said resin coating to the infusible state in the absence of pressure greater than 20 p.s.i.g. to form a porous metal fiber-containing structure of uniform density.

6. Method for forming metal fiber-containing structures of uniform density which comprises the steps of substantially completely coating metal fibers ranging in length from about 0.010 inch to about 3 inches with a uniformly adherent thermosetting synthetic resin, partially curing asid coating to the fusible, heat-hardenable state, raining the so-coated metal fibers into a mold of desired configuration thereby randomly orienting and uniformly distributing said coated metal fibers in said mold, heating said coated metal fibers to a temperature sufficient to sinter said coatings together at points of contact between adjacent metal fibers, and simultaneously curing said resin coating to the infusible state in the absence of pressure greater than 20 p.s.i.g. to form a porous metal fiber-containing structure of uniform density.

7. Method for forming metal fiber-containing structures of uniform density which comprises the steps of free-falling substantially completely coated metal fibers less than about three inches in length into a mold of desired configuration thereby randomly orienting and uniformly distributing said coated metal fibers in said mold, said coating being uniformly adherent and comprising fusible thermosetting synthetic resin, heating said coated metal fibers to a temperature sufficient to sinter said coatings together at points of contact between adjacent metal fibers, and simultaneously curing said resin coating to the infusible state in the absence of pressure greater than 20 p.s.i.g., and thereafter partially impregnating the resultant porous structure with a fluid thermosetting synthetic resin and curing the impregnating resin in the absence of pressure greater than 20 p.s.i.g. to form a porous metal fiber-containing structure of uniform density having reduced porosity with respect to said resultant porous structure.

8. Method for forming metal fiber-containing structures of uniform density which comprises the steps of substantially completely coating metal fibers ranging in length from about 0.010 inch to about 3 inches with a uniformly adherent thermosetting synthetic resin, partially curing said coating to the fusible, heat-hardenable state, raining the so-called metal fibers into a mold of desired configuration thereby randomly orienting and uniformly distributing said coated metal fibers in said mold, heating said coated metal fibers to a temperature sufficient to sinter said coatings together at points of contact between adjacent metal fibers, and simultaneously curing said resin coating to the infusible state in the absense of pressure greater than 20 p.s.i.g. to form a porous structure of bonded together metal fibers, and thereafter impregnating said porous structure with a fluid thermosetting synthetic resin by alternately immersing and removing said structure in and out of said fluid resin until the desired degree of impregnation is achieved, said immersing being carried out by applying sufficient pressure to completely immerse said structure, said pressure being less than 20 p.s.i.g., and curing said impregnating resin by heating to the infusible state under positive pressure no greater than 20 p.s.i.g. to form a metal fiber-containing structure of the desired porosity.

9. Method for forming metal fiber-containing structures of uniform density which comprises the steps of substantially completely coating metal fibers ranging in length from about ⅛ inch to ½ inch with a uniformly adherent thermosetting synthetic resin, partially curing said coating to the fusible, heat-hardenable state, raining the so-coated metal fibers into a mold of desired configuration thereby randomly orienting and uniformly distributing said coated metal fibers in said mold, heating said coated metal fibers to a temperature sufficient to sinter said coatings together at points of contact between adjacent metal fibers, and simultaneously curing said resin coating to the infusible state in the absence of pressure greater than 20 p.s.i.g. to form a porous structure of bonded together metal fibers, and thereafter at least partially impregnating said porous structure with a fluid thermosetting synthetic resin by immersing said structure in said fluid resin by applying sufficient pressure to completely immerse said structure, said pressure being less than 20 p.s.i.g., and curing said impregnating resin by heating to the infusible state in the absence of pressure greater than 20 p.s.i.g. to form a metal fiber-containing structure of uniform density.

References Cited by the Examiner

UNITED STATES PATENTS

| | | | |
|---|---|---|---|
| 2,571,335 | 10/51 | Browne | 154—101 |
| 2,664,376 | 12/53 | Philipps | 156—43 |
| 2,702,261 | 2/55 | Bacon et al. | 154—101 |
| 2,748,028 | 5/56 | Richardson | 117—126 |
| 2,790,741 | 4/57 | Sonneborn et al. | 154—101.01 |
| 2,901,455 | 8/59 | Jurras | 154—53 |
| 2,920,990 | 1/60 | Been et al. | 154—43 |
| 3,002,869 | 10/61 | Hough et al. | 154—43 |

FOREIGN PATENTS 13,375 10/34 Australia.

EARL M. BERGERT, *Primary Examiner.*

ALEXANDER WYMAN, CARL F. KRAFFT,
*Examiners.*

UNITED STATES PATENT OFFICE
CERTIFICATE OF CORRECTION

Patent No. 3,184,368                          May 18, 1965

Appy Juras

It is hereby certified that error appears in the above numbered patent requiring correction and that the said Letters Patent should read as corrected below.

Column 14, line 2, for "under positive pressure no" read -- in the absence of pressure --.

Signed and sealed this 12th day of October 1965.

(SEAL)
Attest:

ERNEST W. SWIDER                          EDWARD J. BRENNER
Attesting Officer                            Commissioner of Patents